United States Patent
Karun et al.

(10) Patent No.: US 7,321,900 B1
(45) Date of Patent: Jan. 22, 2008

(54) REDUCING MEMORY REQUIREMENTS NEEDED TO REPRESENT XML ENTITIES

(75) Inventors: K. Karun, Mountain View, CA (US); Anjana Manian, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 115 days.

(21) Appl. No.: 10/173,466

(22) Filed: Jun. 14, 2002

Related U.S. Application Data (60) Provisional application No. 60/384,583, filed on May 31, 2002, provisional application No. 60/298,437, filed on Jun. 15, 2001.

(51) Int. Cl.
G06F 7/00 (2006.01)

(52) U.S. Cl. .................. 707/103 R; 707/206; 711/101; 711/117; 711/216; 711/221

(58) Field of Classification Search ............ 707/103 R, 707/206; 711/101, 117, 216, 221
See application file for complete search history.

(56) References Cited

U.S. PATENT DOCUMENTS

| | | | | |
|---|---|---|---|---|
| 6,108,698 | A * | 8/2000 | Tenev et al. ................ | 709/220 |
| 6,542,911 | B2 | 4/2003 | Chakraborty et al. | |
| 6,584,458 | B1 * | 6/2003 | Millett et al. ................... | 707/3 |
| 6,654,761 | B2 * | 11/2003 | Tenev et al. ................ | 707/102 |
| 6,662,342 | B1 | 12/2003 | Marcy | |
| 6,675,230 | B1 | 1/2004 | Lewallen | |
| 6,721,723 | B1 * | 4/2004 | Gibson et al. .................. | 707/2 |
| 6,801,224 | B1 | 10/2004 | Lewallen | |
| 6,804,677 | B2 * | 10/2004 | Shadmon et al. ........... | 707/101 |
| 6,826,568 | B2 | 11/2004 | Bernstein et al. | |
| 6,826,727 | B1 | 11/2004 | Mohr et al. | |
| 6,836,857 | B2 | 12/2004 | Ten-Hove et al. | |
| 6,915,304 | B2 * | 7/2005 | Krupa ........................ | 707/102 |
| 6,915,307 | B1 | 7/2005 | Mattis et al. | |
| 6,964,025 | B2 | 11/2005 | Angiulo et al. | |
| 7,031,956 | B1 | 4/2006 | Lee et al. | |
| 7,134,072 | B1 | 11/2006 | Lovett et al. | |

(Continued)

OTHER PUBLICATIONS

Lo et al., "XAS: A System for Accessing Componentized, Virtual XML Documents," IEEE, 2001, pp. 493-502. (References located on enclosed CD-ROM).

(Continued)

*Primary Examiner*—Wilson Lee
*Assistant Examiner*—Michael Le
(74) *Attorney, Agent, or Firm*—Hickman Palermo Truong & Becker LLP (57) ABSTRACT

Described herein are approaches that allow an XML entity to be accessed in a way that requires less memory. These approaches involve dynamically generating and maintaining an in-memory representation of only a portion of an XML tree. The in-memory representation of an XML tree is herein referred to as a node tree. The node tree contains data from the XML tree, and is generated by extracting data from a compressed form of an XML entity. In addition, the node tree contains information about the location of specific elements within the compressed XML entity. The approaches described herein allow an XML tree to be accessed without having to generate an in-memory representation of the whole XML tree, thus reducing the amount of memory needed to access the data in the XML tree.

24 Claims, 7 Drawing Sheets

U.S. PATENT DOCUMENTS

| | | |
|---|---|---|
| 2002/0029229 A1 | 3/2002 | Jakopac et al. |
| 2002/0073019 A1 | 6/2002 | Deaton |
| 2002/0087596 A1* | 7/2002 | Lewontin .................... 707/513 |
| 2002/0116371 A1 | 8/2002 | Dodds et al. |
| 2002/0116457 A1 | 8/2002 | Eshleman et al. |
| 2002/0143512 A1 | 10/2002 | Shamoto et al. |
| 2002/0156811 A1 | 10/2002 | Krupa |
| 2002/0184188 A1* | 12/2002 | Mandyam et al. ............. 707/1 |
| 2003/0078906 A1 | 4/2003 | Ten-Hove et al. |
| 2003/0204787 A1 | 10/2003 | Bartucca et al. |
| 2004/0148278 A1 | 7/2004 | Milo et al. |
| 2004/0267760 A1 | 12/2004 | Brundage et al. |
| 2005/0289125 A1 | 12/2005 | Liu et al. |

OTHER PUBLICATIONS

Zisman et al., "Using XML to Build Consistency Rules for Distributed Specifications," Proceedings of the Tenth International Workshop on Software Specification and Design (IWSD'00), IEEE 2000, 8 pages. (References located on enclosed CD-ROM).

Myllymaki, Jussi, "Effective Wed data Extraction with Standard XML Technologies," WWW10, May 1-5, 2001, pp. 689-696. (References located on enclosed CD-ROM).

Schmidt et al., "Why and How to Benchmark XML Databases," SIGMOND Record, vol. 3, No. 3, Sep. 2001, pp. 27-32. (References located on enclosed CD-ROM).

"Oracle 9i XML Developer's Kits Guide—XDK" Release 2 (9.2), Mar. 2002, 774 pages (Chapters 13-19 extracted, 88 pages). Online retrieved at <www.oracle.com/pls/db92/db92.docindex>.

* cited by examiner

REDUCING MEMORY REQUIREMENTS NEEDED TO REPRESENT XML ENTITIES

RELATED APPLICATION

This patent application claims priority from U.S. Provisional Patent Application No. 60/298,437, entitled "MANAGING XML IN A DATABASE", filed by Mark J. Barrenechea, on Jun. 15, 2001, the contents of which are herein incorporated by reference in its entirety; the patent also claims priority from U.S. Provisional Patent Application No. 60/384,583, entitled "REDUCING MEMORY REQUIREMENTS NEEDED TO REPRESENT XML ENTITIES", filed by K. Karun, et al. on May 31, 2002, the contents of which are herein incorporated by reference in its entirety.

FIELD OF THE INVENTION

The present invention relates to generating in-memory representations of XML entities, and in particular, to efficiently using memory to represent XML entities.

BACKGROUND OF THE INVENTION

The number of businesses exchanging information electronically is proliferating. Businesses that exchange information have recognized the need for a common standard for representing data. Extensible Markup Language ("XML") is rapidly becoming the common standard for representing data.

XML describes and provides structure to a body of data, such as a file or data packet, referred to herein as an XML entity. The XML standard provides for tags that delimit the sections of an XML entity referred to as XML elements. Each XML element may contain a one or more name-value pairs referred to as attributes. The following XML Segment A is provided to illustrate XML.

Segment A

```
<book>
   <publication publisher="Doubleday"
      date="January"></publication>
   <Author>Mark Berry</Author>
</book>
```

XML elements are delimited by a start tag and a corresponding end tag. For example, segment A contains the start tag <Author> and the end tag <Author> to delimit an element. The data between the tags is referred to as the element's content. In the case of this element, the content of the element is the text data Mark Berry.

An element is herein referred to by its start tag. For example, the element delimited by the start and end tags <publication> and </publication> is referred to as the publication element.

Element content may contain various other types of data, which include attributes and other elements. Attributes of an element are represented by attribute name-value pairs. An attribute name-value pair specifies the attribute's name and value. For example, publication contains the attribute name-value pair publisher="Doubleday", specifying an attribute name of publisher and an attribute value of the string literal "Doubleday".

The book element is an example of an element that contains one or more elements. Specifically, book contains two elements: publication and author. An element that is contained by another element is referred to as a descendant of that element. Thus, the publication and author elements are descendants of the book element.

By defining an element that contains attributes and descendant elements, the XML entity defines a hierarchical tree relationship between the element, its descendant elements, and its attribute. A set of elements that have such a hierarchical tree relationship is referred to herein as an XML tree.

An important feature of XML is that it may be used to define XML trees that conform to industry standards. One such standard is the Document Object Model (DOM), promulgated by the W3C.

XML Causes Data Inflation and Taxes Memory

XML features, such as tags and attribute names, allow users to search, sort, identify and extract data from XML entities. However, these features substantially inflate the amount of data needed to represent information in XML relative to the amount of data that would otherwise be required to merely record the information. This inflation can amount to an average increase of 400%.

Because XML inflates the amount of data needed to represent information, the amount of memory needed to store an in-memory representation of an XML tree can be relatively very large. For larger XML entities, the amount of memory needed for an in-memory representation of an XML entity can easily exceed available memory resources on a computer.

Based on the foregoing, it is clearly desirable to provide a mechanism that reduces the amount of memory needed to represent an XML tree.

SUMMARY OF THE INVENTION

Described herein are approaches that allow an XML entity to be accessed in a way that requires less memory. These approaches involve dynamically generating and maintaining an in-memory representation of only a portion of an XML tree. The in-memory representation of an XML tree is herein referred to as a node tree. The node tree contains data from the XML tree, and is generated by extracting data from a compressed form of an XML entity. In addition, the node tree contains information about the location of specific elements within the compressed XML entity. The approaches described herein allow an XML tree to be accessed without having to generate an in-memory representation of the whole XML tree, thus reducing the amount of memory needed to access the data in the XML tree.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for reducing the amount of memory needed to represent an XML tree is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Described herein are approaches that allow an XML entity to be accessed in a way that efficiently uses memory. These approaches involve dynamically generating and maintaining an in-memory representation of only a portion of an XML tree. The in-memory representation of an XML tree is herein referred to as a node tree. The node tree contains data from the XML tree, and is generated by extracting data from a compressed form of an XML entity. In addition, the node tree contains information about the location of specific elements within the compressed XML entity. The approaches described herein allow an XML tree to be accessed without having to generate an in-memory representation of the whole XML tree, thus reducing the amount of memory needed to access the data in the XML tree.

Figure 1:
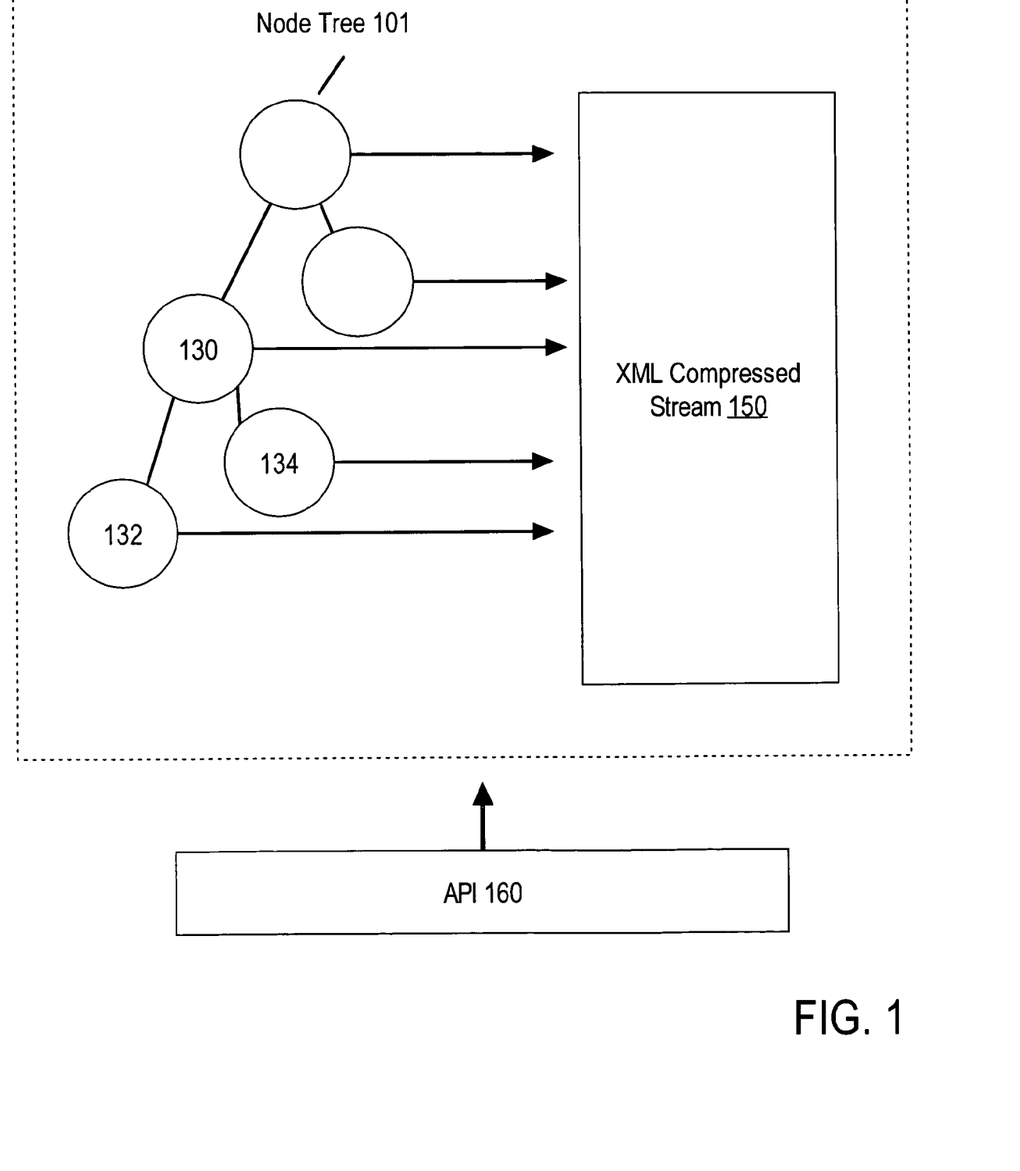
FIG. 1 is a block diagram of a node tree representing a portion of an XML tree defined by a compressed XML entity according to an embodiment of the present invention.

FIG. 1 is a block diagram that depicts a node tree 101. A node tree is a data structure that represents a set of entities and a hierarchical tree relationship between the set of entities, such as the XML elements in an XML entity. Node tree 101 represents a portion of the XML tree in XML compressed stream 150. A node tree contains nodes. Nodes are data structures that represent an entity from the set of entities represented by the node tree. Each node in node tree 101 contains a reference or pointer to the node's corresponding XML element in XML compressed stream 150. In addition, each node in node tree 101 contains one or more links to another node. The links represent hierarchical tree relationships between the elements of the XML tree in XML compressed stream 150.

Hierarchical Relationship Terminology

The following terms are used to describe hierarchical tree relationships between entities, and in particular, elements and nodes that represent them in a node tree. As explained in greater detail below, the hierarchical relationship between nodes in a node tree are defined by the hierarchical relationships between the entities those nodes represent. The terms are illustrated using elements in segment A and node tree 101.

Parent: The term parent is used to refer to an entity that is an immediate ascendant in a hierarchical tree relationship. The element book is the parent of publication and author. Node 130 represents a parent element whose child elements are represented by node 132 and 134. Node 130 is the parent of nodes 132 and 134.

Child: The term child is used to refer to an entity that is an immediate descendant in a hierarchical tree relationship. The element publication and author are each a child of the element book. Nodes 132 and 134 each represent a child element whose parent element is represented by node 130. Nodes 132 and 134 are each a child of node 130.

First and last child: The children of a parent are associated with a "sibling order". The first child is the first child based in the sibling order and the last child is the last child in the sibling order. In the case of XML elements in a XML entity, the sibling order is based on the order in which the children are defined in the parent element. For example, with respect to book, publication is the first child and author is the last child. Node 132 represents the first child of the parent element represented by node 130, and node 134 represents the last child of the parent element. Node 132 is referred as the first child with respect to node 130 and node 134 as the last child.

Previous and Next Sibling: For the children of a parent element, the next sibling of a child element is the next sibling in the sibling order of the children of the parent element. The previous sibling of a child element is the previous sibling in the sibling order. Node 134 represents the next sibling of the element represented by node 132. Node 134 is node 132's next sibling. Node 132 represents the previous sibling of the element represented by node 134. Node 132 is node 134's previous sibling.

Immediate Relative: An immediate relative of a node is either the parent, child, next or previous sibling of the node.

Application Programming Interface

XML compressed stream 150 is accessed through an Application Programming Interface ("API") 160. An API is a set of functions (e.g. object methods) that provide a particular service. In the case of API 160, that service is to provide access to an XML tree. As the functions of API 160 are invoked to access XML compressed stream 150, the nodes are created as needed to store and access data from XML compressed stream 150.

API 160 is associated with a current node. Many functions of API 160 request one or more nodes that have a particular hierarchical tree relationship with the current node. The following is an illustrative set of functions in API 160.

GetFirstChild( ): Retrieves the first child of the current node, that is the element corresponding to the first child of the current node. Sets the current node to the first child.

GetLastChild( ): Retrieves the last child of the current node and sets the current node to the last child.

GetNextSibling( ): Retrieves the next sibling of the current node. Sets the current node to the next sibling.

GetPreviousSibling( ): Retrieves the previous sibling of the current node. Sets the current node to the previous sibling.

GetChildren( ): Loads all children of parent node into memory.

Nodes Created and Released in Response to Requests Issued Through the API

In general, when a node is requested through API 160, it is loaded into memory if not there already. As shall be explained in greater detail, flags are maintained in the nodes. The flags indicate whether a node that has a particular relationship currently resides in memory. The flags may be examined to efficiently determine whether a node is in memory or not.

The memory allotted to storing nodes is finite. As nodes are loaded into memory, eventually all the memory used for storing the nodes is used. When this occurs, to load a node into memory, the memory used to store another node's data is overwritten or replaced with the data of the node to be loaded. When the data of a node is stored in place of another node, the other node is referred to herein as being released.

Likewise, the memory allotted to storing XML stream 150 is finite. XML stream 150 may be too large to fit completely into memory allotted for it. Therefore, portions of compress XML entity 150 may be stored in one or more cache buffers. Portions of XML stream 150 are swapped in and out of the buffers using cache management techniques.

Illustrative XML Entity

Figure 2:
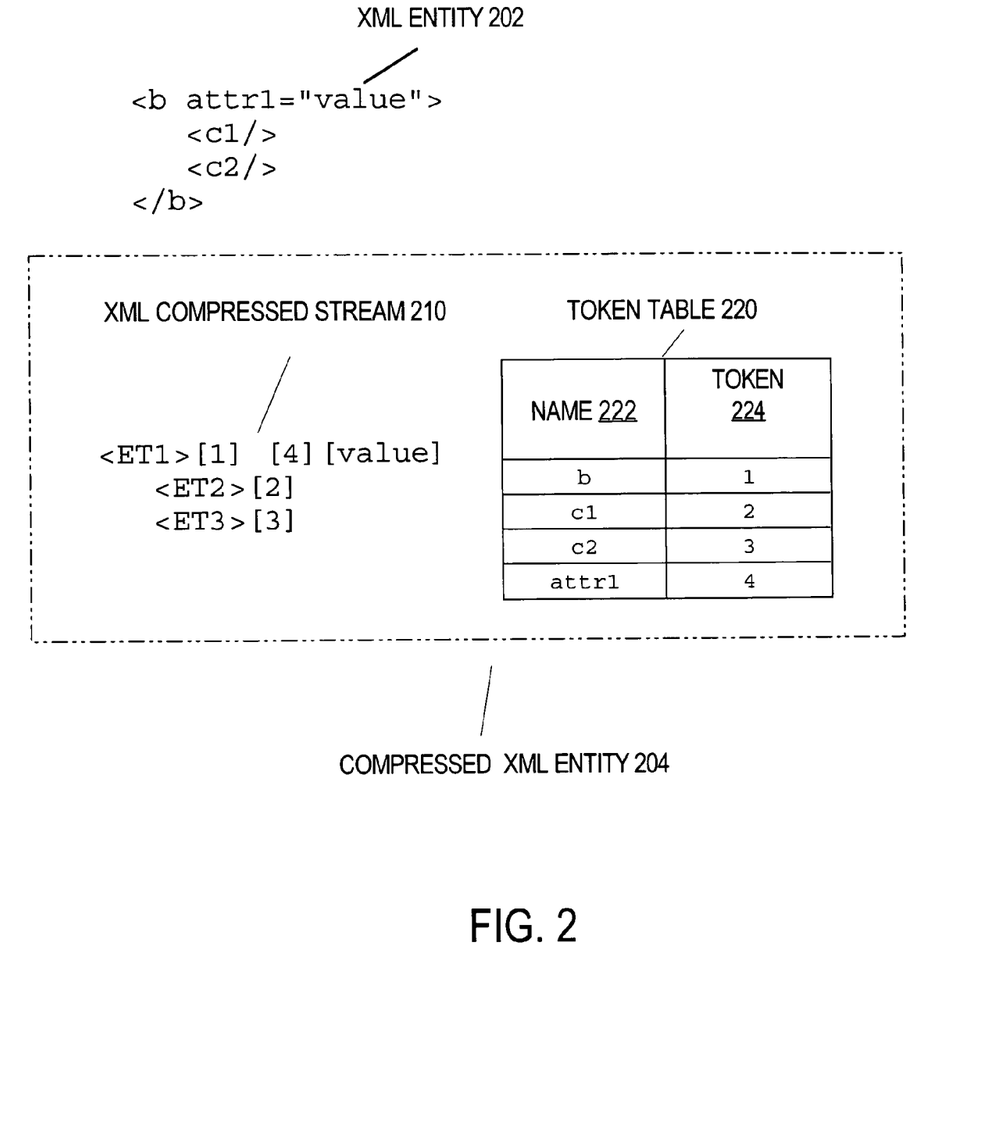
FIG. 2 is a block diagram of an XML entity and its compressed form according to an embodiment of the present invention.

FIG. 2 is a block diagram depicting an XML entity and its compressed form, which are used to illustrate embodiments of the present invention. Referring to FIG. 2, it shows XML entity 202, and its compressed form, compressed XML entity 204. XML entity 202 preferably conforms to the DOM standard. XML entity 202 contains elements b, c1, c2, and attr1. Element b contains attribute attr1. Elements c1 and c2 are empty elements, which do not require end tags. XML entity 202 defines an XML tree with b as the root element and elements c1 and c2 as child elements of element b.

Compressed XML entity 204 includes two components: XML compressed stream 210 and token table 220. XML compressed stream 210 is data that represents an XML entity using element tags and tokens in place of start and end tags. An element tag is a delimiter that demarcates the beginning of an element. A token is a value that identifies an element or attribute name in the XML entity. XML compressed stream 210 includes element tags ET1, ET2, and ET3, and tokens 1, 2, 3, and 4.

Compressed stream 210 uses less data then the XML entity it represents, for several reasons. First, a start and/or an endtag are replaced by an element tag and token, which may be represented using a lesser amount of data than a start tag and end tag. For example, in XML compressed stream 210, an element and token may each be represented by a byte, while each start tag and end tag in XML entity 202 uses multiple bytes to represent multiple characters, e.g., <a> and </a>. For similar reasons, a token uses less amount of data to represent an attribute name.

Token table 220 is a table that maps attributes and elements to tokens. Token table 220 includes columns name 222 and token 224. Column name 222 contains element names and attribute names, and column token 224 contains tokens. Each row in token table 220 maps an element or attribute to a token. The first row in token table 220 maps element b to token 1, the second row element c1 to token 2, the third c2 to 3, and the fourth attribute attr1 to 4.

Illustrative Node Tree

Figure 3:
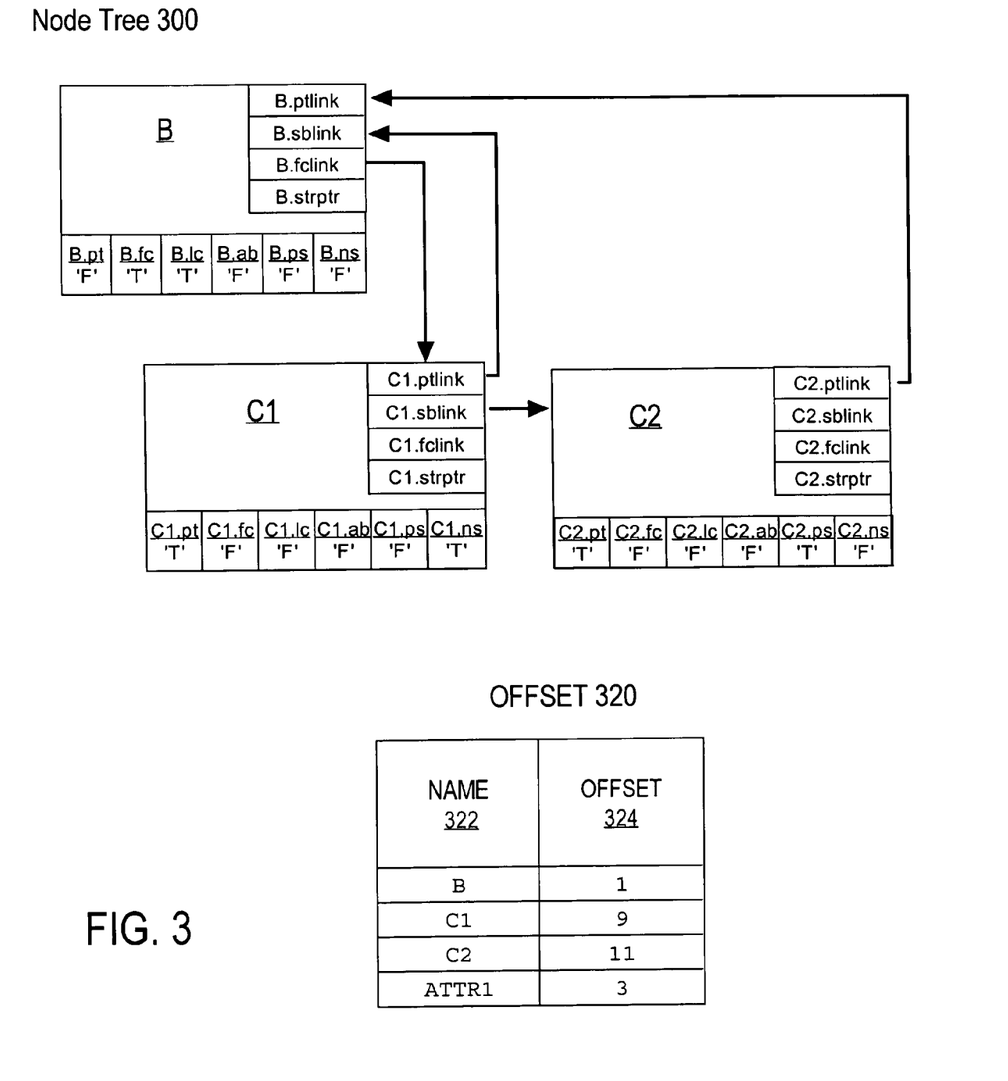
FIG. 3 is a block diagram of a node tree representing a portion of an XML tree defined by a compressed XML entity according to an embodiment of the present invention.

FIG. 3 shows node tree 300, a node tree used to illustrate an embodiment of the present invention. Node tree 300 represents the XML tree defined by XML entity 202. Node tree 300 includes nodes B, C1, and C2, which each represent elements b, c1, and c2.

Each node in node tree 300 contains links to another node. A link is, for example, a memory pointer or reference to another node. Each link represents a hierarchical tree relationship between the elements represented by the nodes. Specifically, node B contains links B.ptlink, B.sblink, and B.fclink. B.ptlink is a parent link which refers to the parent of node B. B.ptlink does not refer to any node because element b is a root node with no parent.

B.fclink is a first child link. A first child link refers to a node's first child. Link B.fclink refers to node C1, which represents the first child element of A.

B.sblink is a sibling link. A sibling link refers to a node's next sibling. In this case, link B.sblink does not refer to any node.

Node C1 includes a parent link, sibling link, and first child link. These links are C1.ptlink, C1.sblink, and C1.fclink, respectively. C1.ptlink refers to node B. C1.fclink does not refer to any link. C1.sblink refers to node C2.

Node C2 includes a parent link, sibling link, and first child link. These links are C2.ptlink, C2.sblink, and C2.fclink, respectively. C2.ptlink refers to node B. C2.fclink and C2.sblink does not refer to any node.

Each node contains a "stream pointer". Node B contains stream pointer B.strpbr node C1 contains C1.strptr, and node C2 contains C2.strptr. A stream pointer points to the beginning location of a node's element in a compressed stream. For example, C1.strptr contains the offset value 9, indicating the number of bytes, inclusively, between the first byte of XML compressed stream 210 and the first byte of element C1 in the compressed stream.

Similarly, B.strptr contains the offset value 1 and C2.strptr the offset value 11. The offset value stored in the stream pointer of a node is referred to herein as the node's offset.

Each node contains a set of flags that indicate whether a node that has a particular hierarchical tree relationship with the node has been loaded into memory. This set of flags includes the following.

First child flag: A first child flag indicates whether a node's first child resides in memory. Nodes B, C1, and C2 contain first child flags B.fc, C1.fc, and C2.fc, respectively. The first child flag is set when a node is created during execution of the GetFirstChild( ) function.

Last child flag: A last child flag indicates whether a node's last child resides in memory. Nodes B, C1, and C2 contain last child flags B.lc, C1.lc, and C2.lc, respectively. The last child flag is set when a node is created during execution of the GetLastChild( ) function.

Attribute flag: An attribute flag indicates whether the node's attribute nodes reside in memory. Nodes B, C1, and C2 contain attribute flags B.ab, C1.ab, and C2.ab, respectively.

Previous sibling flag: A previous sibling flag indicates whether a node's previous sibling resides in memory. Nodes B, C1, and C2 contain previous sibling flags B.ps, C1.ps, and C2.ps, respectively.

Next sibling flag: A next sibling flag indicates whether a node's next sibling resides in memory. Nodes B, C1, and C2 contain next sibling flags B.ns, C1.ns, and C2.ns, respectively.

Node tree 300 contains data structures which have not been depicted in FIG. 3 for purposes of exposition. For example, a node may contain a link to another data structure that holds the text value of an element. In addition, a node may contain a link to a series of one or more linked nodes which hold attribute values for an element's attributes.

Offset Table

Offset table 320 has two columns: name 322 and offset 324. Name 322 contains element and attribute names and offset 324 contains offset values into XML compressed stream 210. Each row in offset table 320 corresponds to an element or an attribute of an element loaded into memory, and maps the element or attribute to an offset value within XML compressed stream 210. Offset table 320 maps element b to offset value 1, c1 to offset value 9, c2 to offset value 11, and attribute attr1 to 3.

Loading a First Child Node

Figure 4:
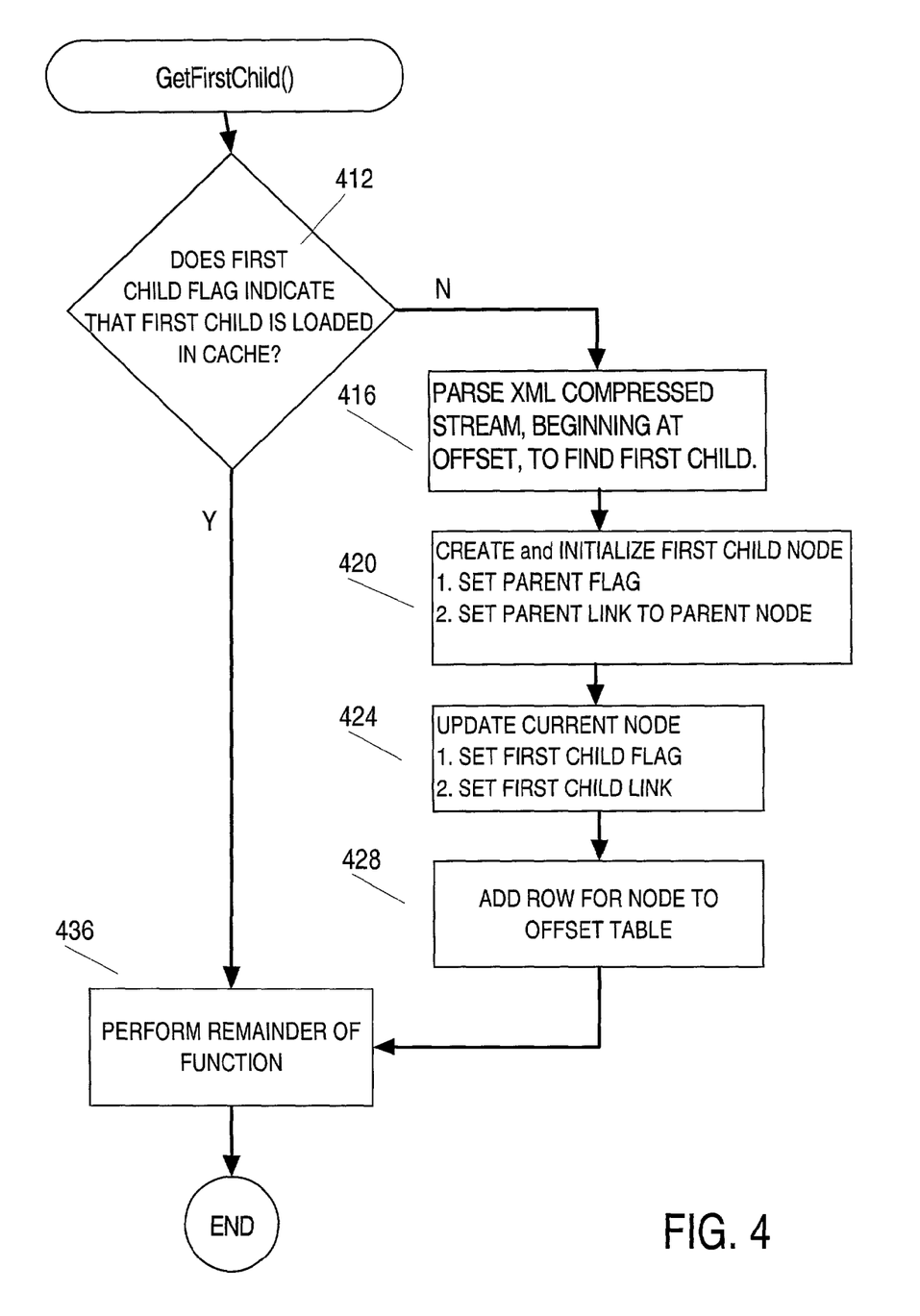
FIG. 4 is a flowchart of a process that creates a node in a node tree according to an embodiment of the present invention.

FIG. 4 shows a process for loading a first child node, which is performed when executing the GetFirstChild( ) function. For purposes of illustration, it is presumed only node B of node tree 300 is loaded, and that offset table 320 contains only one row, which maps node b to offset value 1. Node B is the current node.

At step 412, it is determined whether the first child flag indicates that the first child node is loaded. If the first child flag does indicate that the first child flag is loaded, then execution of the steps proceeds to step 436, where the remainder of the function is executed. Otherwise, execution proceeds to step 416. In the current example, the first child flag of node B, B.fc, indicates that node B's first child has not been loaded. Hence, execution proceeds to step 416.

At step 416, XML compressed stream 210 is parsed, beginning at the current nodes offset within the XML compressed stream 210, to find the first child element within the current node. In the current example, the first child element found is c1.

At step 420, the first child node is created and initialized, based on information parsed and extracted from the first child element found at step 416. The step of creating and initializing the node includes setting the parent flag to TRUE and setting the parent link to refer to the parent node. When a node is created, its flags are initialized to a default value of FALSE. So the remaining flags in the node have a value of FALSE. Also by default, any links are initialized so they do not refer to any node. In the current example, node C1 is created, c1.ptlink is set to refer to B, and C1.pt is set to TRUE.

At step 424, the current node is updated to reflect that its first child has been loaded. The first child flag is set to TRUE and the first child link is set to refer to the first child. In the current example, B.fc is set to TRUE, and B.fclink is set to refer to node C1.

At step 428, a row for the just created node is added to the offset table 320. In the current example, a row mapping C1 to its offset value of 9 is added to the offset table 320.

At step 436, the execution of the function is completed. Operations performed at this step include setting the current node to the first child.

The operations performed by the processes depicted for GetFirstChild( ) are illustrative of those performed by other functions and processes that create and initialize nodes, and, in particular, to those that are performed during the execution of other functions of API 160. In general, when a node is created by executing a function of API 160, the links and flags of the current node are updated to reflect the newly created node.

Nodes for attributes of an element may be created in several ways. When a node for an element is created, nodes for its attributes may also be created in memory. The nodes for the attributes are linked to the node for the element. In another embodiment, nodes for attributes are not loaded until requested via API 160.

Illustrative Process for Releasing a Node

Figure 5:
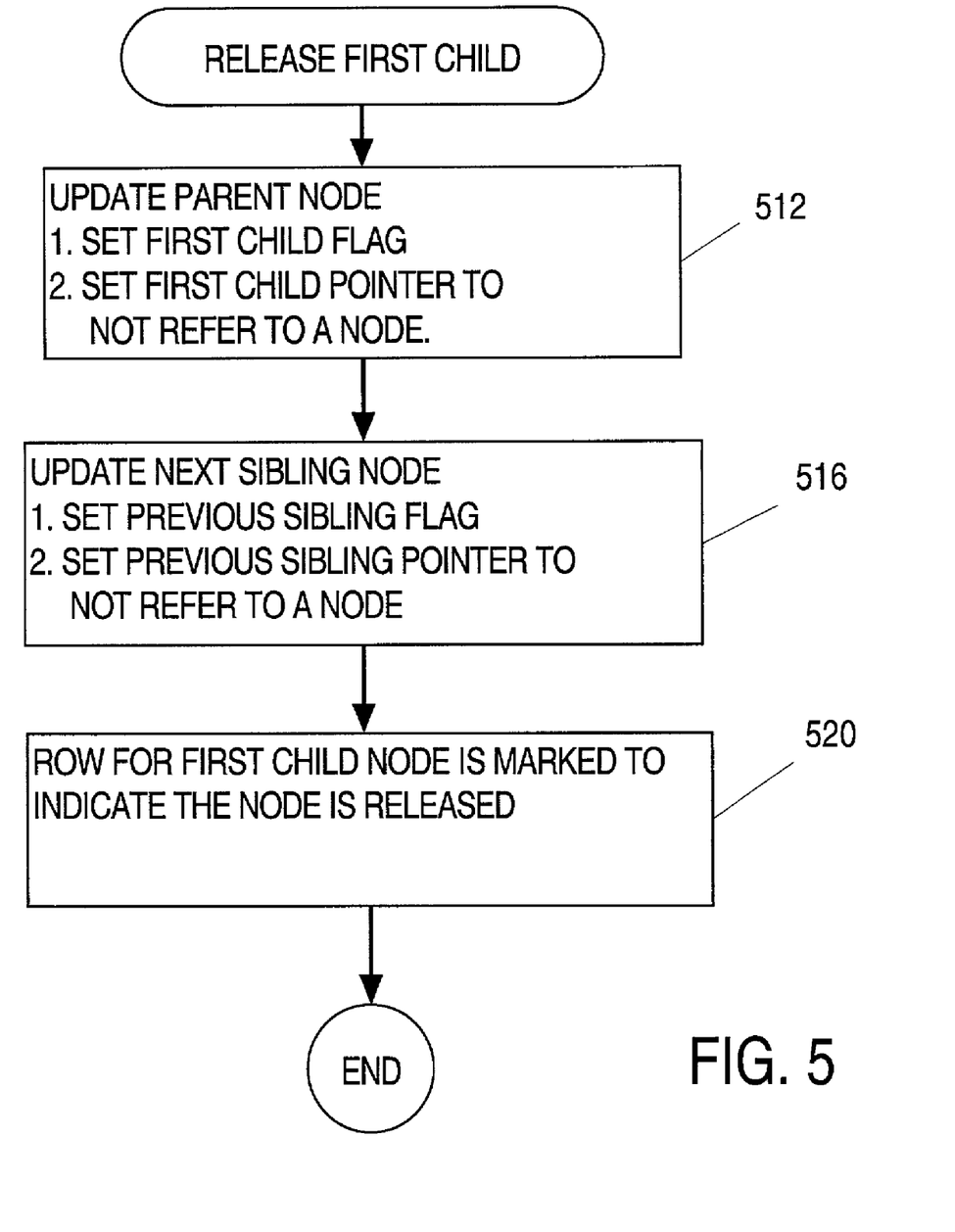
FIG. 5 is a flowchart of a process for releasing a node from memory according to an embodiment of the present invention.

FIG. 5 shows a process that is performed when releasing a first child node. For purposes of illustration, nodes B, C1, and C2 are loaded in memory as depicted in FIG. 3. C1 is the first child node being released.

Referring to FIG. 5, at step 512, the parent node of the first child is updated to reflect that its first child has been released. The first child flag is set to FALSE and the first child link is set so that it no longer refers to a node. In the current example, B.pt is set to FALSE and the B.fclink is set so that it no longer refers to a node.

At step 516, the next sibling node of the first child is updated to reflect that its previous sibling has been released. The previous sibling flag is set to FALSE and the previous sibling link is set to no longer refer to a node. In the current example, C2.ps is set to FALSE and C2.pclink is set so that it no longer refers to a node.

At step 520, the row corresponding to the first child node in offset table 320 is marked to indicate that the node has been released. Execution of the steps ends.

The process for releasing a first child is illustrative of processes that release nodes in general. Typically, when a node is released, nodes referred to by a link of the node to be released are updated to reflect that the node is no longer in memory.

Flags and Links do not Always Reflect Whether a Node is in Memory

After an element's node is released, another node for that element may be later loaded. When loaded, the other node's flags and links may not reflect that an immediate relative is currently loaded when in fact the immediate relative is. For example, after node C1 in the previous example has been released, it is possible that the first child of node B may again be requested (by invoking GetFirstChild( )) before node C2 is released. In this case, a node C1' is created using the process shown in FIG. 4. As a result of executing this process, the first child flag B.fc and the first child link B.fclink of node B reflect that node C1' is loaded, but the next sibling flag and next sibling link of C1' do not reflect that C1's next sibling, node C2, is loaded, when in fact it is.

A dangling relative is used herein to refer to an immediate relative of a node, where the flags and links of the node do not reflect that the immediate relative is in memory when in fact it is. Thus, with respect to C1', node C2 is a dangling relative.

To efficiently use memory, duplicate nodes should not be created for elements already represented by a node in a node tree. To avoid creating duplicate nodes, mechanisms are needed to definitively detect whether a node for the element has already been loaded. While a node's flags may be used to indicate that an immediate relative is not in the cache, in some circumstances, as explained above, the flags may not be exclusively relied upon to definitely determine that an immediate relative does not reside in memory. For processes that create nodes under circumstances where there is a possibility of a dangling relative, it is useful to have a mechanism that accounts for dangling relatives. The following is an example of a process that uses such a mechanism.

Node Creation Process for GetNextSibling( )

Figure 6:
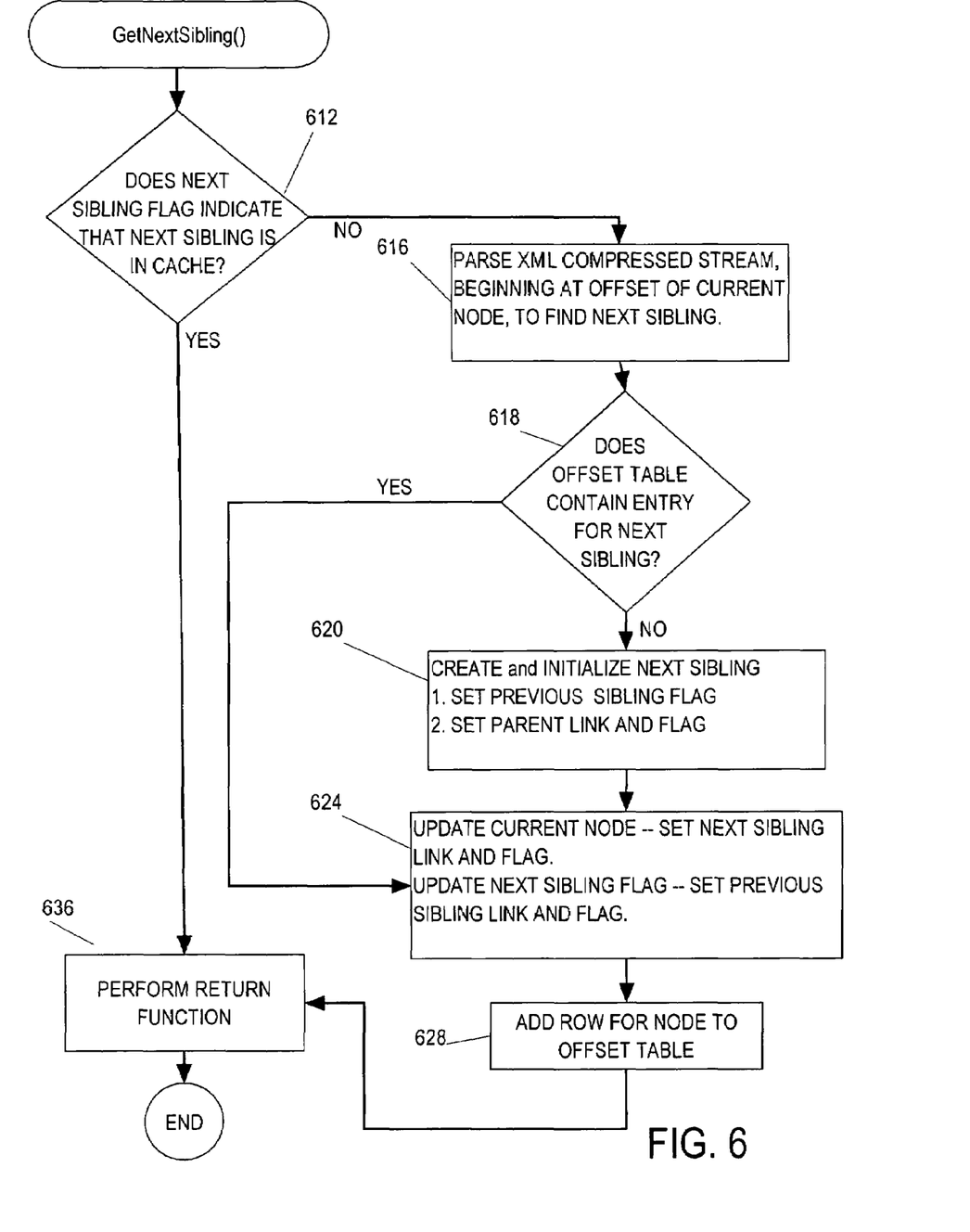
FIG. 6 is a flowchart of a process that creates a node in a node tree according to an embodiment of the present invention.

FIG. 6 is a process followed to execute GetNextSibling( ). When creating a node, the process accounts for dangling relatives, as is described in greater detail. The process is illustrated using node tree 300. For purposes of illustration, node C1 is the current node, and node C2 is a dangling relative with respect to node C1. Thus, C1.ns is set to FALSE and C1.sblink is not set to refer to any node.

Referring to FIG. 6, at step 612, it is determined whether the next sibling flag indicates that the next sibling is in memory. If the next sibling flag does indicate that the next sibling flag is in memory, then execution of the steps proceeds to step 636, where the remainder of the function is executed. Otherwise, execution proceeds to step 616. In the current example, the next sibling flag of node C1, C1.ns, does not indicate that node C1's next sibling has been loaded. Hence, execution proceeds to step 616.

At step 616, the XML compressed stream 210 is parsed, beginning at the current node's offset within the XML compressed stream 210, to find the next sibling element. In the current example, the next sibling element found is C2.

At step 618, it is determined whether or not the offset table 320 contains an entry for the next sibling element. If offset table 320 does contain such an entry, then a node for the next sibling element is already in memory. Execution of the steps flows to step 624 rather than 620, thereby avoiding creating a duplicate node.

At step 620, the next sibling node is created and initialized, based on information parsed and extracted from the next sibling element found at step 616. The step of creating and initializing the node includes setting the parent flag to TRUE, setting the parent link to the parent node, and setting the previous sibling flag to TRUE.

At step 624, the current node is updated to reflect that its next sibling is in memory. The next sibling flag is set to TRUE and the next sibling link is set to refer to node C2. The next sibling node is then updated to reflect that its previous sibling is in memory. The previous sibling flag is set to TRUE and the previous sibling link is set to refer to node C1. At step 628, a row for the just created node is added to offset table 320.

The process executed for GetNextSibling( ) is but one example of a process that accounts for dangling relatives when creating nodes. Another example is GetLastChild( ). The reason for this is that a last child may be created when executing an API 160 function that does not set the last child flag, such as the function GetNextSibling( ). As shown in FIG. 6, when a sibling node is created, its parent node is not updated. If the created node is for a last child element, the created node is a dangling relative because its parent node's last child flag does not indicate that the last child is loaded.

The present invention is not limited to generating node trees for data entities that conform to XML. The techniques for creating, maintaining, and storing node trees may be used for node trees that represent a portion of other types of bodies of data that contain data parts that are hierarchically related. Finally, while the term "element" has been used to refer to elements of an XML entity, such use of the term element is not anyway intended to limit the semantic scope of the term to an XML element.

Hardware Overview

Figure 7:
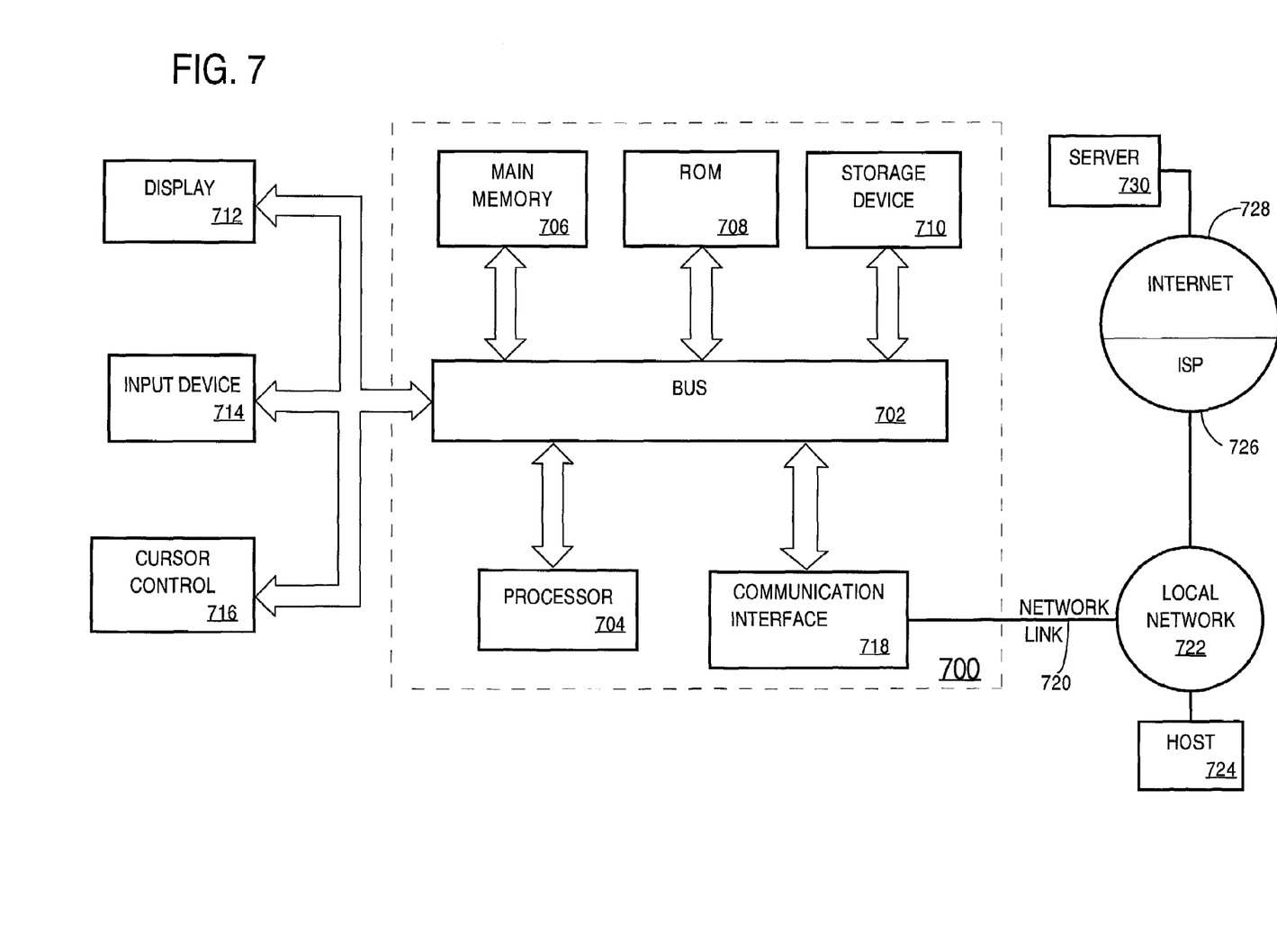
FIG. 7 is a block diagram of a computer system that may be used to implement an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method used in accessing and storing a hierarchical tree representation of elements that reside in a body of data, the method comprising the steps of:
    parsing said body of data to generate in memory a node tree that represents elements that reside in the body of data and that reflects a hierarchical tree relationship between said elements in said body of data;
    after said generating said node tree, said body of data includes certain elements for which there is no corresponding node in the node tree;
    wherein a first node in said node tree:
        corresponds to a first element in said body of data, wherein said first element contains a second element, said first element being hierarchically related to the second element as an ascendant of said second element, and
        includes first element location data identifying the location of the first element within said body of data;
    after said generating in memory said node tree and while said node tree is in memory, receiving a request that requires access to a second node in said node tree, wherein said second node corresponds to the second element in said body of data;
    in response to receiving said request, determining that said second node is not in memory; and
    in response to determining that said second node is not in memory:
        using said first element location data to locate where within said body of data to begin parsing to extract data that is contained within the first element for said second element, and
    generating said second node based on said extracted data.

2. The method of claim 1, further including the step of: loading at least a portion of said body of data into memory, wherein said body of data is a compressed form of another body of data defining said elements.

3. The method of claim 2, wherein said other body of data conforms to XML.

4. The method of claim 1, wherein the step of determining that said second node is not in memory is based on examining data in said first node that indicates whether said second node is in memory.

5. The method of claim 1, wherein the step of generating said second node includes generating within said second node second element location data identifying the location of the second element within said body of data.

6. A method used in accessing and storing a hierarchical tree representation of elements that reside in a body of data, the method comprising the steps of:
    receiving a request that requires access to a first node in a node tree that reflects a hierarchical tree relationship between said elements in said body of data, said node tree residing in a memory, wherein said first node corresponds to a first element in said body of data;
    wherein a second node in said node tree:
        corresponds to a second element in said body of data, said second element being hierarchically related to the first element, and
        includes a plurality of flags that include a certain flag, wherein:
            each flag of said plurality of flags only indicates whether a node that corresponds to an element having a particular hierarchical relationship to said second element resides within said memory;
            each flag of said plurality of flags represents a different hierarchical relationship than that represented by any other flag of said plurality of flags;
            each flag of said plurality of flags is set to one of two states, said two states comprising a first state as TRUE and a second state as FALSE;
            one of the TRUE and FALSE states indicates that said node that corresponds to an element having a particular hierarchical relationship to said second element resides within said memory; and
            the other of the TRUE and FALSE states indicates that said node that corresponds to said element having a particular hierarchical relationship to said second element does not reside within said memory;
    examining the certain flag of said second node to determine whether said first node resides in the memory; and
    determining that said first node does not reside in said memory; and
    in response to determining that said first node does not reside in said memory:
        parsing said body of data to extract data for said first element, and
        generating said first node in the memory based on the extracted data.

7. The method of claim 6, wherein the steps further include updating said certain flag to indicate that said first node resides in said memory.

8. The method of claim 6, wherein the steps further include updating a link, different than said certain flag, to refer to said first node.

9. The method of claim 6, wherein the steps further include updating another flag in said first node to indicate that said second node resides in said memory.

10. The method of claim 6, wherein
the steps further include updating the plurality of flags to indicate whether the node corresponding to each of the plurality of flags resides in the memory.

11. The method of claim 6, wherein:
each record of a body of records indicates that a node for a particular element of said elements resides in the memory; and
the steps further include updating said body of records to indicate that the first node resides in the memory.

12. The method of claim 11, wherein:
said certain flag does not indicate that said first node resides in the memory; and
the steps further include examining said body of records to determine whether said first node resides in said memory.

13. A computer-readable storage medium carrying one or more sequences of instructions for accessing and storing a hierarchical tree representation of elements that reside in a body of data, wherein execution of the one or more sequences of instructions by one or more processors causes the one or more processors to perform the steps of:
parsing said body of data to generate in memory a node tree that represents elements that reside in the body of data and that reflects a hierarchical tree relationship between said elements in said body of data;
after said generating said node tree, said body of data includes certain elements for which there is no corresponding node in the node tree;
wherein a first node in said node tree:
corresponds to a first element in said body of data, wherein said first element contains a second element, said first element being hierarchically related to the second element as an ascendant of said second element, and
includes first element location data identifying the location of the first element within said body of data;
after said generating in memory said node tree and while said node tree is in memory, receiving a request that requires access to a second node in said node tree, wherein said second node corresponds to the second element in said body of data;
in response to receiving said request, determining that said second node is not in memory; and
in response to determining that said second node is not in memory:
using said first element location data to locate where within said body of data to begin parsing to extract data that is contained within the first element for said second element, and
generating said second node based on said extracted data.

14. The computer-readable storage medium of claim 13, the steps further including:
loading at least a portion of said body of data into memory, wherein said body of data is a compressed form of another body of data defining said elements.

15. The computer-readable storage medium of claim 14, wherein said other body of data conforms to XML.

16. The computer-readable storage medium of claim 13, wherein the step of determining that said second node is not in memory is based on examining data in said first node that indicates whether said second node is in memory.

17. The computer-readable storage medium of claim 13, wherein the step of generating said second node includes generating within said second node second element location data identifying the location of the second element within said body of data.

18. A computer-readable storage medium carrying one or more sequences of instructions for accessing and storing a hierarchical tree representation of elements that reside in a body of data, wherein execution of the one or more sequences of instructions by one or more processors causes the one or more processors to perform the steps of:
receiving a request that requires access to a first node in a node tree that reflects a hierarchical tree relationship between said elements in said body of data, said node tree residing in a memory, wherein said first node corresponds to a first element in said body of data;
wherein a second node in said node tree:
corresponds to a second element in said body of data, said second element being hierarchically related to the first element, and
includes a plurality of flags that include a certain flag, wherein:
each flag of said plurality of flags only indicates whether a node that corresponds to an element having a particular hierarchical relationship to said second element resides within said memory;
each flag of said plurality of flags represents a different hierarchical relationship than that represented by any other flag of said plurality of flags;
each flag of said plurality of flags is set to one of two states, said two states comprising a first state as TRUE and a second state as FALSE;
one of the TRUE and FALSE states indicates that said node that corresponds to an element having a particular hierarchical relationship to said second element resides within said memory; and
the other of the TRUE and FALSE states indicates that said node that corresponds to said element having a particular hierarchical relationship to said second element does not reside within said memory;
examining the certain flag of said second node to determine whether said first node resides in the memory; and
determining that said first node does not reside in said memory; and
in response to determining that said first node does not reside in said memory:
parsing said body of data to extract data for said first element, and
generating said first node in the memory based on the extracted data.

19. The computer-readable storage medium of claim 18, wherein the steps further include updating said certain flag to indicate that said first node resides in said memory.

20. The computer-readable storage medium of claim 18, wherein the steps further include updating a link, different than said certain flag, to refer to said first node.

21. The computer-readable storage medium of claim 18, wherein the steps further include updating another flag in said first node to indicate that said second node resides in said memory.

22. The computer-readable storage medium of claim 18, wherein the steps further include updating the plurality of flags to indicate whether the node corresponding to each of the plurality of flags resides in the memory.

23. The computer-readable storage medium of claim 18, wherein:
- each record of a body of records indicates that a node for a particular element of said elements resides in the memory; and
- the steps further include updating said body of records to indicate that the first node resides in the memory.

24. The computer-readable storage medium of claim 23, wherein:
- said certain flag does not indicate that said first node resides in the memory; and
- the steps further include examining said body of records to determine whether said first node resides in said memory.

* * * * *